(No Model.) EMIL RITTER v. SKODA. 7 Sheets—Sheet 3.
QUICK FIRING GUN.
No. 448,841. Patented Mar. 24, 1891.
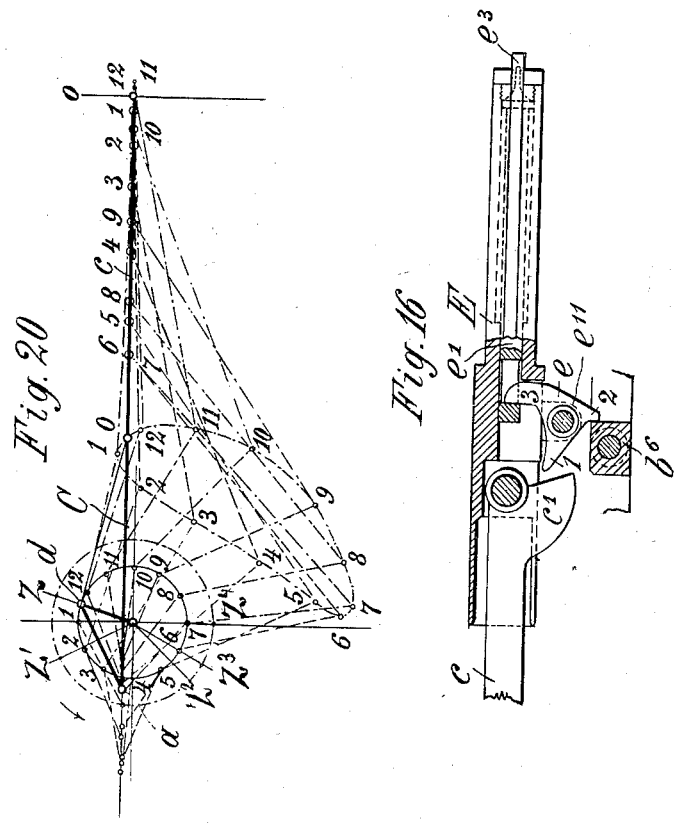
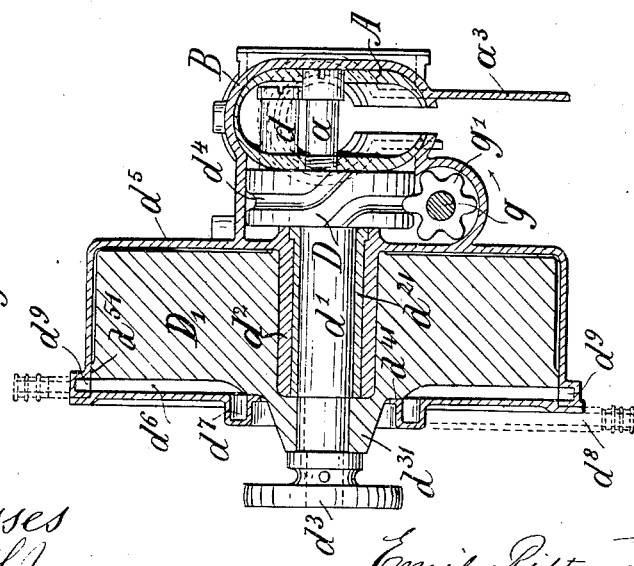
Witnesses
Henry Oth Jr
B. W. Sommers
Inventor
Emil Ritter v. Skoda
by Henry Oth
atty (No Model.) 7 Sheets—Sheet 4.
EMIL RITTER v. SKODA.
QUICK FIRING GUN.
No. 448,841. Patented Mar. 24, 1891.
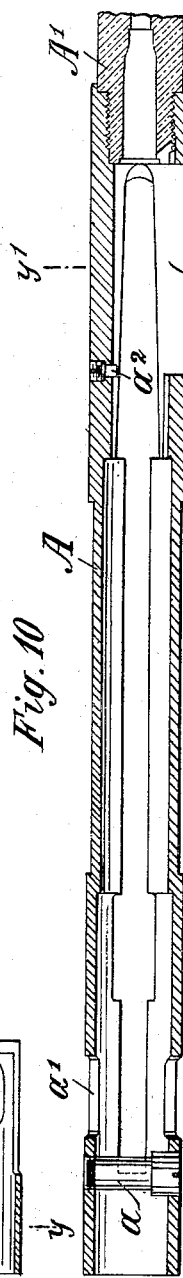
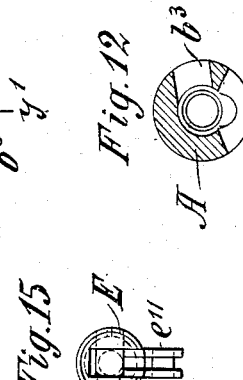
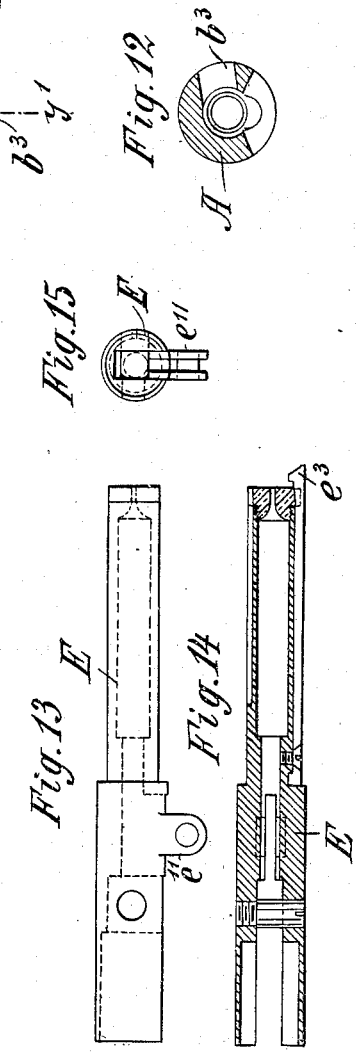
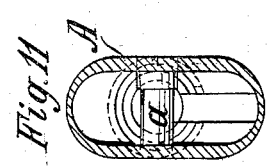
Witnesses
Henry Orth Jr
B. W. Sommers
Inventor
Emil Ritter v. Skoda
pr Henry Orth
atty.

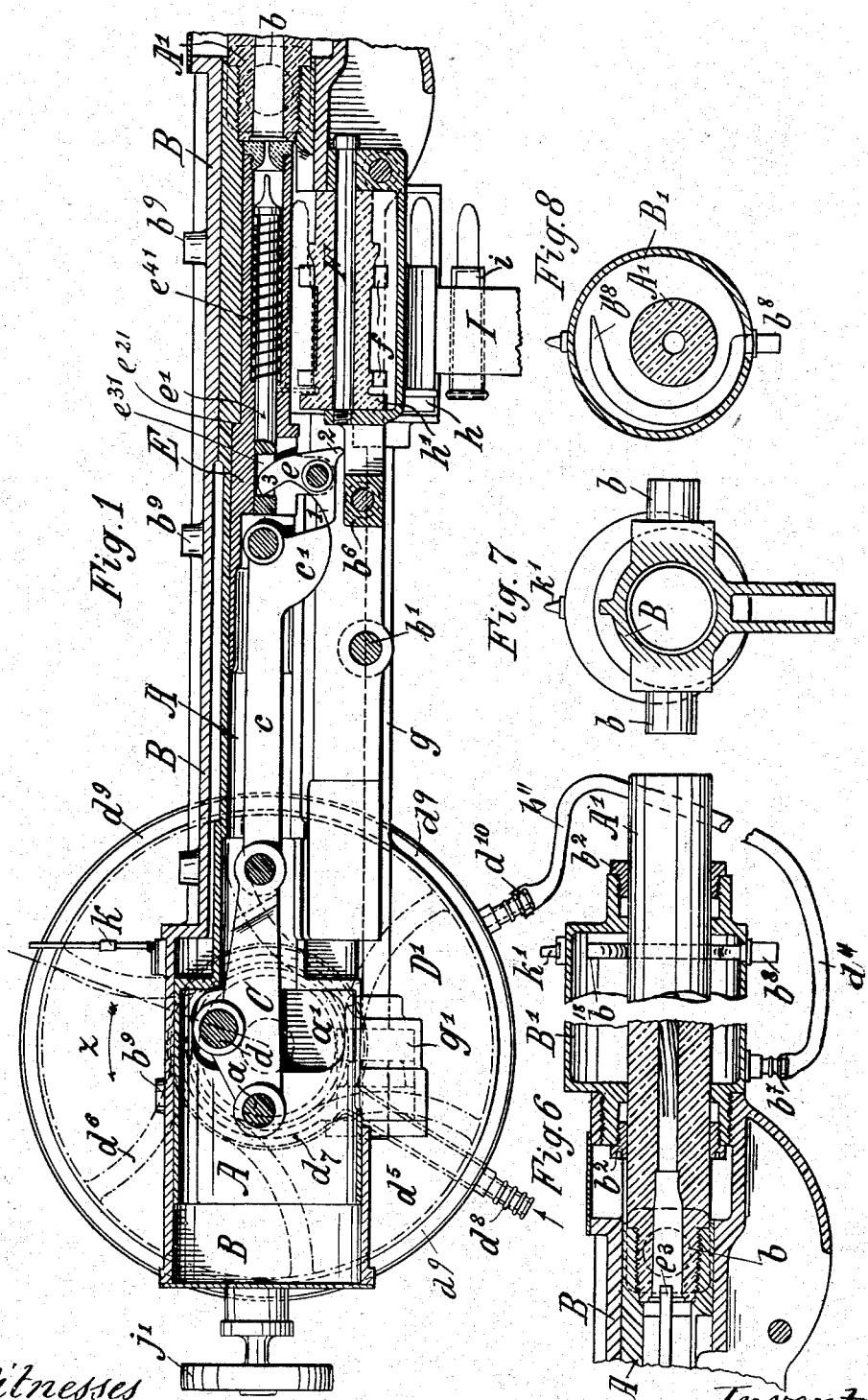

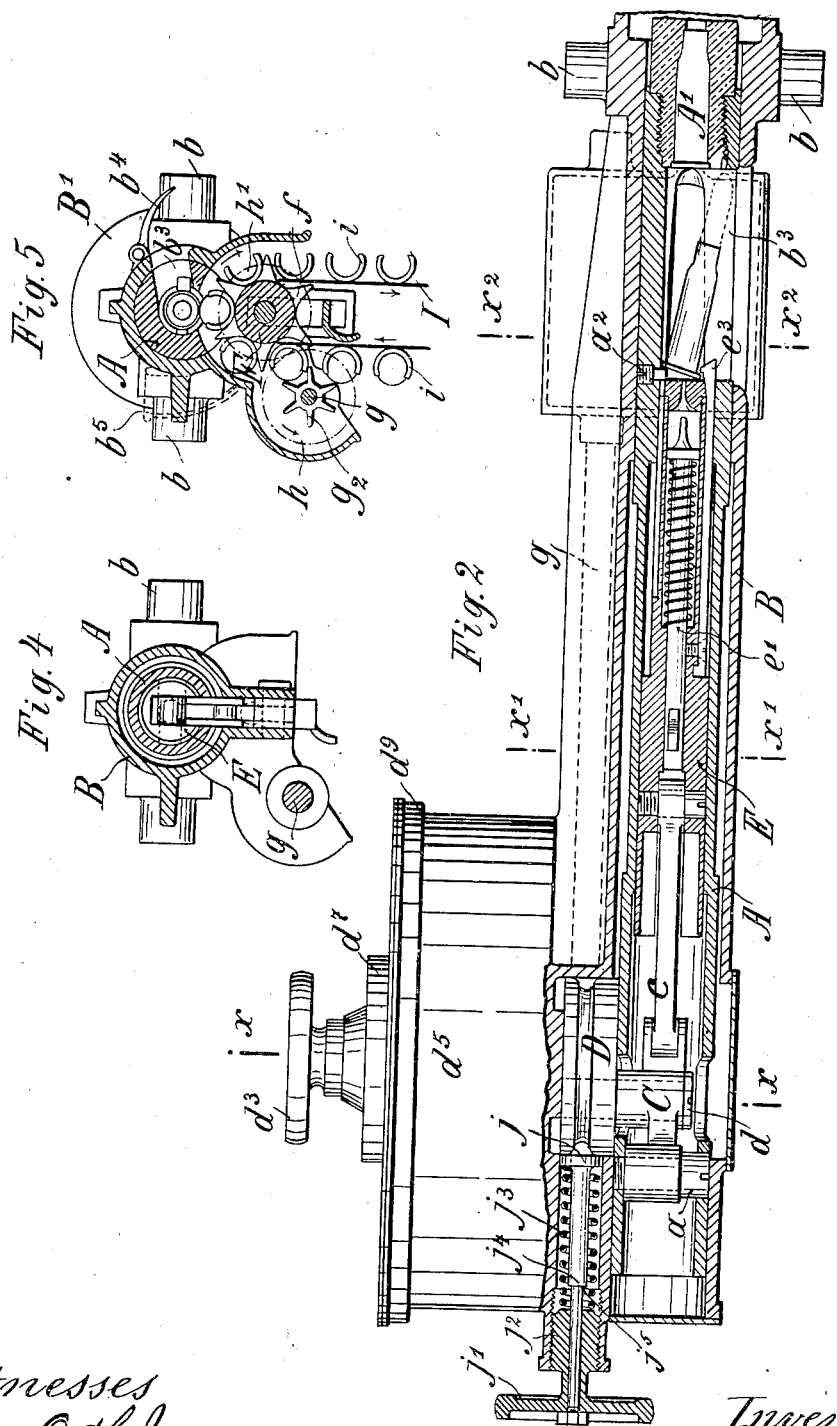

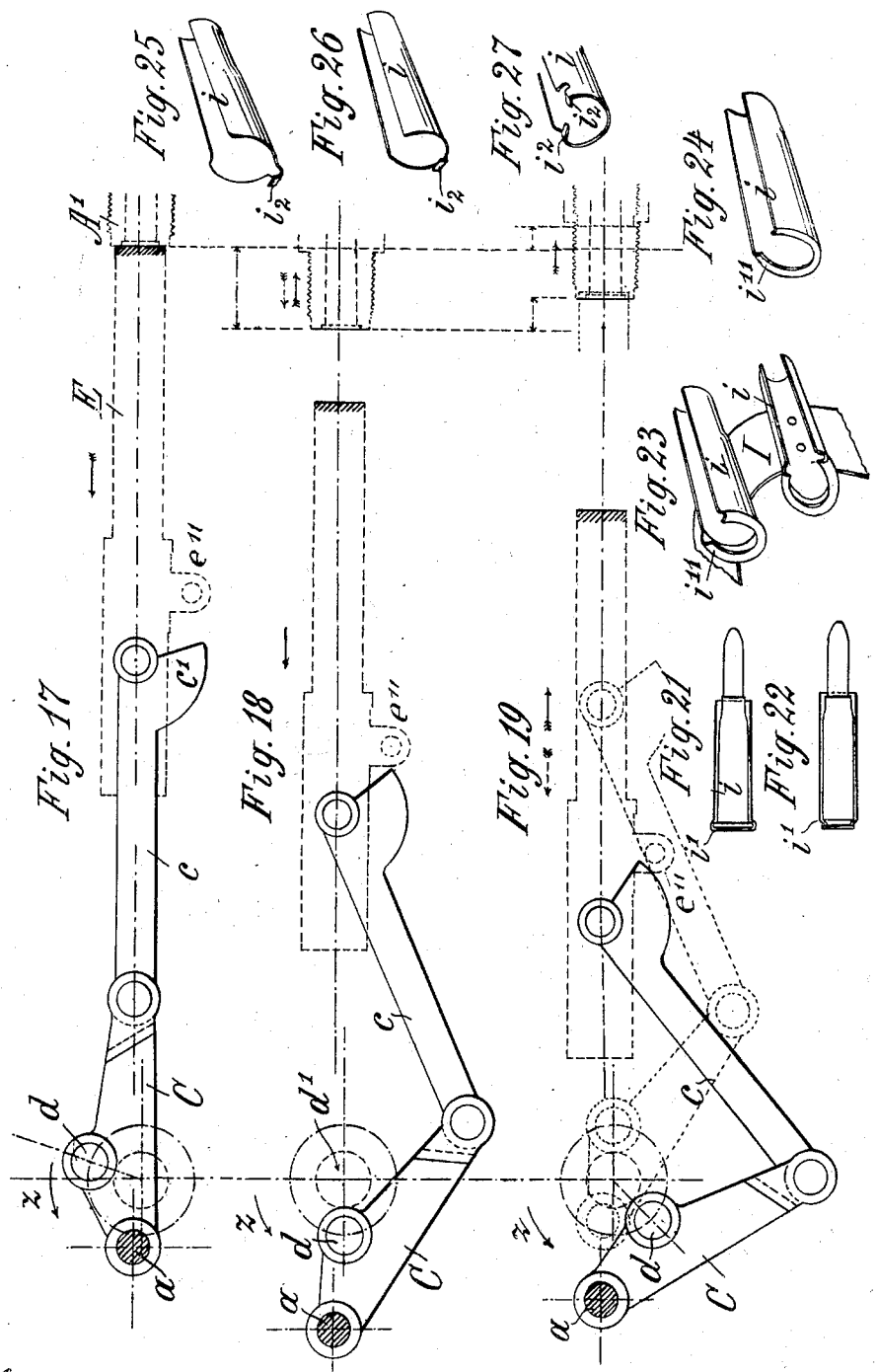

(No Model.) EMIL RITTER v. SKODA. 7 Sheets—Sheet 6.
QUICK FIRING GUN.
No. 448,841. Patented Mar. 24, 1891.
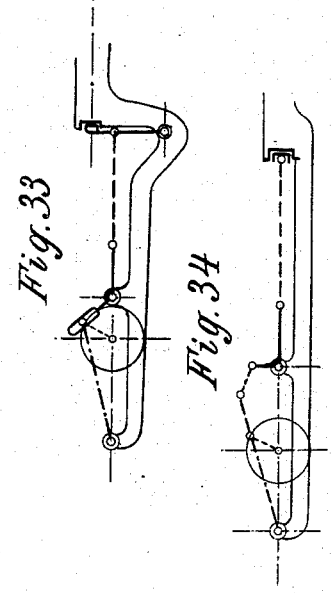
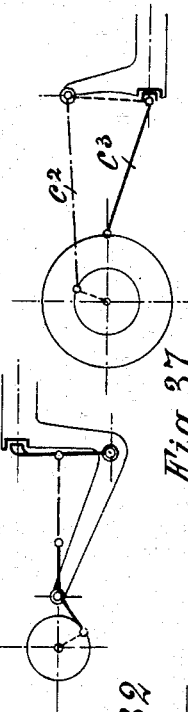
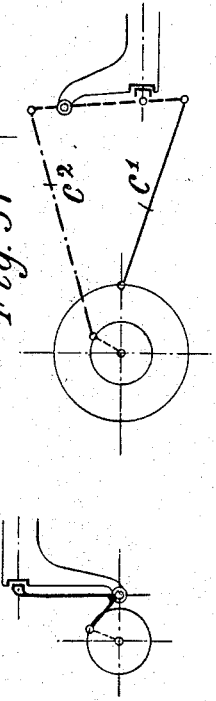
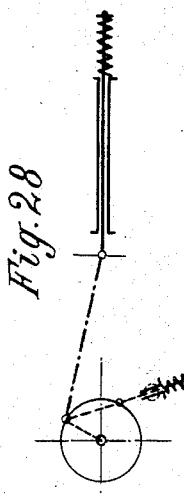
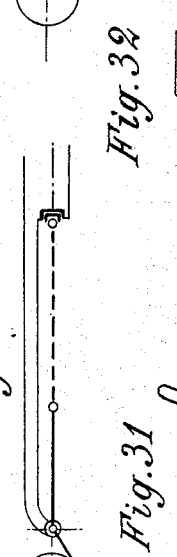
Witnesses
Inventor
Emil Ritter v. Skoda

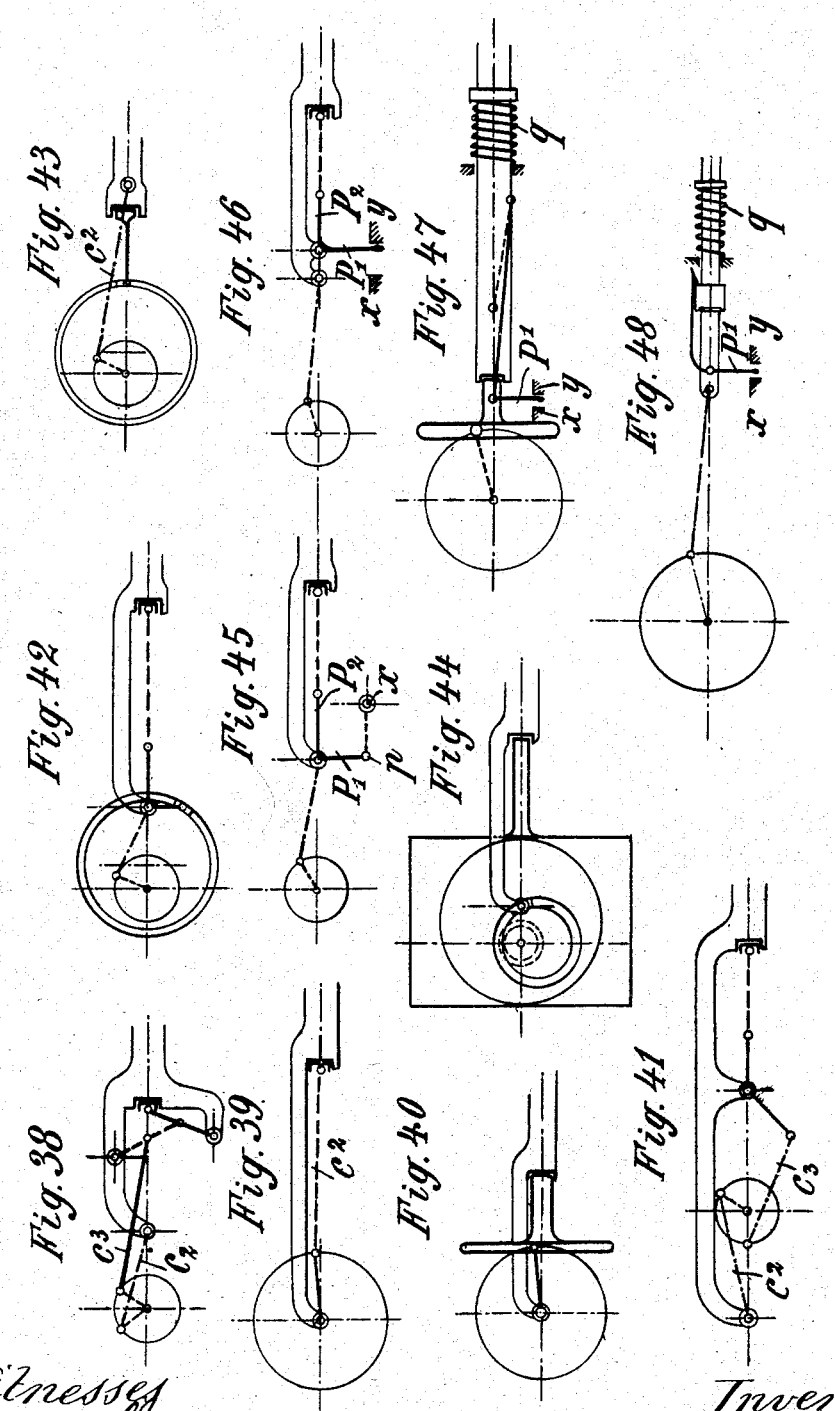

United States Patent Office.

EMIL RITTER VON SKODA, OF PILSEN, AUSTRIA-HUNGARY.

QUICK-FIRING GUN.

SPECIFICATION forming part of Letters Patent No. 448,841, dated March 24, 1891.

Application filed July 24, 1890. Serial No. 359,814. (No model.)

*To all whom it may concern:*

Be it known that I, EMIL RITTER VON SKODA, a subject of the Emperor of Austria, residing at Pilsen, in the Province of Bohemia, in the Empire of Austria-Hungary, have invented certain new and useful Improvements in Quick-Fire Guns; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to machine-guns, and has for its object to provide means whereby the operations of loading, firing, and the cooling of the gun are automatically effected, and whereby these operations are automatically continued in case the charge should fail to explode or should several successive charges fail to explode.

To these ends the invention consists in the combination, with the barrel and the breech mechanism, of a power-accumulator connected with this device and adapted to take up and store the power of the recoil and give the same up for the purpose of returning the gun into its normal position, introducing a charge into said gun, and firing the charge and operating mechanism, by means of which a cooling agent is supplied to the gun for cooling the same.

The invention further consists in mechanisms and combinations of mechanisms whereby the desired results are attained, and in structural features and details, as will now be fully described, reference being had to the accompanying drawings, in which—

Figure 1 is a vertical longitudinal section of a portion of a gun, illustrating part of my invention. Fig. 2 is a horizontal section thereof, some of the parts being shown in plan. Figs. 3, 4, and 5 are sections taken, respectively, on lines $x\ x$, $x'\ x'$, and $x^2\ x^2$ of Fig. 2. Fig. 6 is a longitudinal section, partly in elevation, of the front end of the gun, showing the cooling-jacket. Figs. 7 and 8 are transverse sections taken, respectively, about at the rear and front end of the gun-barrel, showing the cooling-jacket. Figs. 9 and 10 show the receiver by a vertical and a horizontal longitudinal section, respectively. Figs. 11 and 12 are sections taken, respectively, on lines $y\ y$ and $y'\ y'$ of Figs. 9 and 10. Figs. 13, 14, and 15 show the breech-cylinder in elevation, horizontal longitudinal section, and in rear elevation, respectively. Fig. 16 is a sectional detail view of the breech-cylinder, showing the position of the firing mechanism after firing. Figs. 17, 18, and 19 are sectional elevations showing the various positions assumed by the mechanism for transmitting the recoil of the gun-barrel to the power-storing device. Fig. 20 is a diagram illustrating the movements of the transmitting mechanism during the motion of the power-storing devices. Figs. 21 to 27 are detail views illustrating variously-constructed holders for the cartridges, said holders forming part of the cartridge-feeding mechanism; and Figs. 28 to 48 are diagrams illustrating means adapted for use with various breech-actions for transmitting the recoil to the power-storing device.

The breech-action illustrated in Figs. 1 to 20 is what is known as the "cylinder breech-action;" but, as will hereinafter appear, my invention is applicable to any form or construction of breech-action usually employed in firearms. As a means for utilizing the power of the recoil, I employ a fly-wheel $D'$, Fig. 3, that is contained in a housing or casing $d^5$, in which is formed a tubular axial bearing $d^2$ for the shaft $d'$ of the said fly-wheel $D'$, a suitable bushing $d^{21}$ being interposed between said shaft and its bearings. By means of the described construction the shaft $d'$ is entirely relieved of the weight of the fly-wheel, which is a solid cylinder, as shown. The bushing $d^{21}$ may be a tubular hub formed on a disk $D$, thus serving also as a means for securing the disk to said shaft, or it may be an ordinary bushing, in which case the disk D may form an integral part of or may be keyed to the shaft. The arrangement of these parts is such as to form a fluid-tight joint to prevent the cooling agent drawn into casing $d^5$ from escaping along the shaft $d'$ and to prevent air entering said casing.

In order to cause the fly-wheel $D'$ to rotate with shaft $d'$, the axial hub $d^2$ of the casing does not extend from side to side, as shown in Fig. 3, and the fly-wheel has a projecting hub $d^{31}$, provided with a key-groove, and is secured to the outer end of the shaft by means of a key or feather. The hub $d^{31}$ is conoidal and extends through a suitable opening in the rear face of the casing $d^5$, and said wheel D' has a bearing-face $d^{41}$, that bears against a corresponding face on the casing, and an annular bearing-flange $d^{51}$, that bears against the inner periphery of said casing to form substantially fluid-tight joints.

The casing has in its rear face an annular passage $d^6$, to the inlet or suction port $d^8$ of which is connected a suction-pipe, (not shown,) and a peripheral passage $d^9$, to the outlet or forcing port or passage $d^{10}$ of which is connected the forcing or exhaust pipe $d^{11}$, (shown in dotted lines, Figs. 1 and 6,) that is connected with the inlet-pipe $b^7$ of the cooling-jacket B', (shown in said Fig. 6,) said jacket having at its opposite end an exhaust-pipe $b^8$, that extends into the jacket, that portion of the exhaust-pipe within said jacket extending around and over the gun-barrel A', and its intake $b^{13}$, Fig. 8, being beveled off and lying in a substantially horizontal plane, so as to take the cooling agent as near as possible to the periphery of the jacket in the plane of its vertical diameter to keep said jacket constantly and approximately full, the cooling agent used being water, though any other suitable cooling agent may be employed.

Suitable stuffing-box glands $b^2$, Fig. 6, are provided to form a fluid-tight joint between the gun-barrel and the tubular hubs of the cooling-jacket B'.

The shaft $d'$ carries at its outer end a hand-wheel $d^3$, by means of which it may be revolved for the purpose of loading and firing the gun for a first shot, after which the power of the recoil of the gun alone is used for this purpose. The fly-wheel D', as will be seen, performs, besides the functions hereinafter to be described, also the function of a pump-piston to supply the cooling agent to the cooling-jacket and at the same time prevent the overheating of its bearings.

The described arrangement for supplying the cooling agent to the gun is a very simple and economical one; yet I do not desire to limit myself thereto, it being obvious that any other form of pump or forcing apparatus may be employed to supply the cooling agent, and such pump or apparatus may be operated by the fly-wheel through the medium of suitable intermediate connections, which any skilled mechanic will be enabled to provide, or such pump or forcing apparatus may be operated by an independent power.

For the purpose of controlling the operation of firing I provide means for controlling the speed of the fly-wheel D', which, as shown in Fig. 2, consists of a brake-rod $j^4$, provided at its inner end with a brake-shoe $j$, that bears upon the periphery of the disk D. The rod $j^4$ is loosely connected with a hand-wheel $j'$, on which is formed a screw-plug $j^2$, that screws in the outer end of a tubular casing. A coiled spring $j^3$ encompasses the rod $j^4$, so that by revolving the hand-wheel $j'$ in one or the other direction to increase or decrease the tension of the spring $j^3$ the brake-shoe will be applied with greater or less force to the periphery of the disk D. If the screw-plug $j^2$ is screwed in sufficiently as to bear against the annular shoulder $j^5$, formed by the thicker portion of the rod $j^4$, the brake-shoe may be applied to this disk with such power as to stop its rotation when firing is to cease. Instead of the described brake, a gravity or hydraulic brake may be employed. In the former case the weight exerted upon the brake-shoe may be varied, and in the latter case means will be provided to control the sectional area of the conduits through which the water flows.

The gun proper is constructed as follows: B is a casing or housing that is provided with trunnions $b$, Figs. 2, 4, 5, and 7, and also shown in dotted lines in Figs. 1 and 6, by means of which said casing is mounted upon a suitable gun-carriage. (Not shown.) The rear end of the casing B is enlarged for accommodation and necessary movements of the operating mechanism. In the casing B is contained the receiver, Figs. 1, 2, 9, and 10, having the general form of casing B, into the forward end of which receiver is screwed the gun-barrel A', Figs. 1, 2, and 6, said receiver A and barrel A' having free motion in casing B and cooling-jacket B'. In its enlarged rear portion the receiver A is provided with a vertical slot $a'$, through which projects the crank or eccentric pin $d$ on the wheel D, secured to the fly-wheel shaft $d'$, hereinbefore referred to, and, as shown in Figs. 1, 2, and 3, said slot being of such width and length as to admit of the unimpeded revolution of the crank-pin as the receiver A is moved to and fro by the combined action of the recoil and the power accumulated by the fly-wheel or by said accumulated power alone. Upon the crank-pin $d$ of wheel D is loosely mounted a lever C, whose rear end is fulcrumed on a pin $a$, secured to the receiver A, the forward end of said lever being pivotally connected with one end of a link $c$, whose opposite end is similarly connected with the rear end of the breech-bolt, said link $c$ having a downwardly-projecting lug or nose $c'$, whose front face is rectilinear.

The breech-bolt E, as shown in Figs. 1, 2, 13, 14, 15, and 16, is a cylindrical bolt having its rear end extended and slotted longitudinally for the reception, connection, and operation of the link $c$, and in front of said slotted rear end extension said bolt has a vertical slot, through which extends the arm 3 of a three-armed sear $e$, said arm 3 projecting into a vertical slot $e^{31}$, formed in the firing-pin $e'$, that is, as usual, contained in the bore of the breech-bolt and actuated by a spring $e^{41}$, whose ends abut, respectively, against an annular shoulder formed by the enlarged portion of said bore that contains the said spring and against a collar at the forward end of the pin. In Fig. 1 I have illustrated these parts in their relative positions at the moment of firing, the lever C and link $c$ lying in a straight line and locking the breech-bolt E to the breech-chamber of the barrel A', while the arm 1 of the sear $e$, which is pivoted in lugs $e^{11}$, depending from the breech-bolt E, is out of engagement with the nose $c'$ of link $c$, thus allowing the spring $e^{11}$ to project the firing-pin $e'$ and explode the charge. When the firing-pin has been projected, the parts will be in the relative positions shown in Fig. 16, the arm 2 of the sear bearing against an abutment $b^6$. As the receiver A, with the barrel A' and breech-bolt E, are moved back by the recoil, the wheel D is revolved in the direction of arrow $z$, Figs. 17, 18, and 19, thereby spinning the fly-wheel D' around with great velocity in the same direction, the lever C and link $c$ assuming successively the positions shown in full lines in Figs. 18 and 19, and in dotted lines in said Fig. 19, returning finally to their normal positions shown in Figs. 1 and 17. As the receiver A moves back the sear is tilted rearward by reason of its arm 2 being in contact with the abutment $b^6$, by which motion of the sear the firing-pin is moved back to full-cock. At the same time the lever C and link $c$ assume a more or less angular position relatively to the breech-bolt, thereby throwing the nose $c'$ upwardly, and when the sear has been tilted sufficiently to disengage its arm 2 from abutment $b^6$ the said nose $c'$ of link $c$ will have moved upwardly to such an extent as to lie between the arms 1 and 3 of said sear, thus locking the same against rotation and locking the firing-pin into its full-cock position, to be automatically released when the parts again reach the relative positions shown in Figs. 1 and 17. As the receiver, the barrel, and the breech-bolt move back under the energy of the recoil and the crank $d$ reaches the dead-center of its disk, Fig. 18, the energy of the recoil will cease to act upon the crank and fly-wheel, the crank-disk being thereafter revolved by the energy stored by the fly-wheel D'. During the movement of the crank-pin $d$ from its position Figs. 1 and 17 to its position Fig. 18 the breech-bolt, barrel, and receiver first move together, so that the breech will for a short time remain closed; but inasmuch as the link $c$ and breech-bolt E are connected to the longer arm of the lever C, and the receiver A to the shorter arm of said lever, the said breech-bolt will move back at a greater speed than the receiver A and barrel A' after the disk D has made a partial revolution, thus opening the breech. Immediately after the breech is fully opened the rim of the empty shell will strike an abutment-screw $a^2$, Fig. 2, and will be released from the hold of the shell-extractor $e^3$ and ejected through a lateral opening $b^3$, Figs. 2 and 5, above which is secured or pivoted a curved deflecting-plate $b^4$, that deflects the shell downwardly to the ground to avoid possible injury to the gunners. When the breech-bolt has reached a position for the ejection of the empty cartridge-shell, it has also reached the limit of its rearward movement, the lever C and link $c$ being then in the position shown in Fig. 19. However, as the said lever and link move from the position shown in Fig. 18 to that shown in Fig. 19—namely, while the breech-bolt is completing its rearward movement—the receiver A and the barrel A' have already commenced to move forward again, the breech being therefore wide open. The crank-pin $d$, receiver A, barrel A', lever C, and link $c$ will now move from the position shown in full lines to that shown in dotted lines, Fig. 19, carrying the breech-bolt E along, and as the said bolt commences its forward motion a fresh cartridge is fed to the breech, to be carried into the breech-chamber of the barrel A' by the breech-bolt.

The feeding of the cartridges to the breech may be effected by hand or mechanically, and the feeding devices may or are preferably operated by the fly-wheel D', or said cartridges may be supplied to the breech by means of a loading-frame, in which case a feed-hopper $b^5$ (shown in dotted lines in Fig. 5) is provided, from which the first cartridge passes by its own weight between two teeth of a feed-drum F, constructed in the form of a star-wheel, that is revolved as hereinafter explained, and carries the cartridge into the path of the advancing breech-bolt E, so that as the parts move from the position shown in Fig. 19 back to that shown in Fig. 17 under the impulse of the fly-wheel the said cartridge is carried into the breech-chamber of the barrel. The feed-drum, which is pivoted in the receiver below the breech-bolt, has a pinion $h'$ formed at its rear end or mounted on its rear journal, that is in gear with a pinion $h$ on a shaft $g$. (Shown in full lines in Fig. 1 and in dotted lines in Fig. 5.) The shaft $g$ carries at its rear end a pinion $g'$, Fig. 3, the teeth of which take into the peripheral groove $d^4$ of the disk or wheel D on fly-wheel shaft $d'$, whereby the pinion shaft $g$ is revolved, and therethrough and through the gearing $h$ $h'$ the feed-wheel F to feed the cartridges into the path of the breech-bolt E. Instead of the feed-hopper an endless feed-belt I may be employed, Figs. 1 and 5, said feed-belt being provided at equal distances apart with cartridge-holders $i$, made of sheet metal and secured transversely of the belt. The holders are so constructed as to prevent the cartridges from slipping out, and to this end they are made tapering, open at top, and more or less elastic to clasp the cartridges. At the rear end the holder is crimped to form a groove for the flange of the cartridge-shell, as shown at $i'$, Figs. 21 and 22, or said holder may be provided with an inwardly-bent flange $i^{11}$, Figs. 23 and 24, or with inwardly-turned lips $i^2$, Figs. 25, 26, and 27, to prevent the cartridges from falling out. The belt I is hung upon the drum F between its teeth, so that the opposite ends of the holder will lie between said teeth or star-points. (See Fig. 1.)

To more effectually feed and guide the cartridges, I preferably mount upon the shaft $g$ a star-wheel $g^2$, Fig. 5, that acts upon the cartridge-holders and serves as a guide and feed-wheel.

From what has been said above it will be seen that the rectilinear movement of the gun-barrel and receiver under the energy of the recoil is converted into rotary motion by transmission of the fly-wheel and that this rotary motion is a continuous one, as will be readily understood by an inspection of diagram Fig. 20, in which the distance traveled by the gun-barrel before the breech-bolt moves to uncover the breech is indicated by $Z Z'$, the motion of the breech-bolt to uncover or open the breech by $Z' Z^2$, the travel during which the empty shell is ejected by $Z^2 Z^3$, the travel during which a fresh cartridge is fed to the receiver or guide-cylinder by $Z^3 Z^4$, and, finally, the movements of the parts to carry the cartridge to the breech-chamber and close the breech by $Z^4 Z$.

The numerals 1 to 12 indicate the movements of the lever C and its link or connecting-rod $c$ during one revolution of the fly-wheel or crank $d$ of disk D, and the rectilinear movement of the lever-fulcrum $a$ is shown by dotted lines drawn to the left of the diagram from the points 1 to 12. It has also been stated above that the energy due to the recoil of the gun acts upon the crank $d$ until the latter lies in the plane of the axis of the gun-barrel or at the dead-point—that is to say, while the breech is being partially opened or during the time the crank $d$ travels from $Z$ to $Z'$ and the said axial plane, or during a little more than one-quarter revolution of the crank, the fly-wheel continuing to revolve by the power stored and moves the parts from the position Fig. 18 to that Fig. 19 in full lines, then to the position shown in dotted lines, Fig. 19, and back to their normal position Fig. 17, at which moment the gun is automatically fired, a fresh impulse being given to the fly-wheel D' by the recoil. Should, however, the gun miss fire, the energy stored by the fly-wheel will keep the same in rotation, the cartridge being duly ejected and a fresh one inserted. In fact the power stored in the fly-wheel after two or more shots have been fired is sufficient to keep the parts in motion even should two or more cartridges fail to explode.

K, Fig. 1, is the rear sight, K' the front sight, and $b^9$ are bosses that have an axial aperture for the reception of lubricators, and $b'$ is a cross-bolt in the housing B, with which the elevating-screw may be connected.

I have hereinbefore stated that the improvements are applicable to various forms of breech-action.

In Figs. 28 to 35 I have shown various breech-actions adapted to be operated through the medium of the lever and the link motions described, and in Figs. 36 to 44 I have shown examples of means for operating the breech mechanism by the reciprocating motion of the gun-barrel and the energy stored in the fly-wheel or by means of the latter alone.

In Figs. 36 to 48 the gun-barrel is moved by the connecting-rod $c^2$, and the breech-bolt by a connecting-rod $c^3$. In the construction shown in the said figures and in the construction hereinbefore described, as well as hereinafter to be described, the crank, disk, lever, and connecting-rod may be replaced by an eccentric and eccentric-rod, or the crank-pin may be caused to work in a slot of the connecting-rod, or a cam may be used to actuate the connecting devices or a pin working in a cam-groove of a disk secured to the fly-wheel shaft, and gearing may be interposed in such connections, all of which are well-known mechanical equivalents of the mechanism described.

In the example shown in Figs. 39 and 40 the motion of the gun is nil, the breech-bolt alone moving, while in Figs. 45 and 46 the breech-bolt is impelled by the recoil of the gun-barrel. In the examples last referred to the barrel only is connected with the crank-disk, the movement of the breech-bolt being effected by the bell-crank lever P P$^2$, connected at $p$ with the receiver by means of links $p$ $x$ or working between two stops $x$ $y$ on said receiver. The recoil of the gun may also be made to act on a spring for the purpose of storing a part of the energy of such recoil, which spring may be made to act in any desired direction or on any desired crank-pin to set in motion a certain moving element or elements, as shown in Fig. 28, and buffers may be provided at suitable points to deaden the shocks.

In the construction shown in Figs. 47 and 48 the breech-bolt alone operates the crank-disk and fly-wheel, the gun-barrel moving only as long as there is gas-pressure therein, when it will be returned to its normal position by a spring $q$ in consequence of the lever P' striking against stop $x$, while the breech-bolt will continue its rearward movement and through the crank-disk and fly-wheel effect the other operations.

When a lever-and-link connection is employed, the housing B is provided with a pendent protective or guard plate or shield $a^3$, Fig. 3.

Having now described my invention, what I claim, and desire to secure by Letters Patent, is—

1. In a breech-loading machine-gun, the combination, with the gun and breech-bolt adapted to have a rectilinear motion in their bearings, of a power-storing device and a connection between said device, the breech-bolt, and the gun, adapted to impart to the power-storing device a continuous rotary motion in one direction, for the purposes set forth.

2. In a breech-loading machine-gun, the combination, with the gun and the breech-bolt, said parts being adapted to have endwise motion in their bearings, of a power-storing device and a variable-speed connection connecting the power-storing device with the gun and breech-bolt and adapted to impart to the power-storing device a continuous rotary motion in one direction, for the purposes set forth.

3. In a breech-loading machine-gun, the combination, with the gun and breech-bolt adapted to have a rectilinear motion in their bearings, of a power-storing device and a connection between the latter, the breech-bolt, and gun, adapted to impart to the power-storing device a continuous rotary motion in one direction and to vary the relative rectilinear speed of the gun and breech-bolt, for the purposes set forth.

4. In a breech-loading machine-gun, the combination, with the gun and breech-bolt adapted to have a rectilinear motion in their bearings, of a fly-wheel, a crank adapted to revolve with and about the axis of said fly-wheel, and a lever-and-link connection connecting the crank with the breech-bolt and gun and adapted to impart a continuous rotary motion to the crank and therethrough to the fly-wheel, for the purposes set forth.

5. In a breech-loading machine-gun, the combination, with the gun and its receiver, the latter provided with a vertically-slotted enlarged extension and adapted to have a rectilinear motion with the gun in its bearings, and the breech-bolt having a like motion in its bearings, of a fly-wheel, a crank revoluble with and about the axis of the fly-wheel, said crank extending through the vertical slot in the receiver, and a connection between said receiver, breech-bolt, and crank, adapted to convert the rectilinear motion of said parts into rotary motion, for the purposes set forth.

6. In a breech-loading machine-gun, the combination, with the gun, its receiver, and breech-bolt, said parts having endwise motion in their bearings, of a fly-wheel, a crank adapted to revolve with and about the axis of said wheel, and a variable-speed connection between the receiver and crank and between the crank and the breech-bolt, adapted to impart a continuous rotary motion to the crank and therethrough to the fly-wheel, for the purposes set forth.

7. In a breech-loading machine-gun, the combination, with the gun-barrel, its receiver, and the breech-bolt, of a fly-wheel, a crank adapted to revolve with and about the axis of the wheel, a two-armed lever having arms of unequal length connected with the crank, a connection between the shorter arm of the lever and the receiver, and a connection between the longer arm of the said lever and the breech-bolt, for the purposes set forth.

8. In a breech-loading machine-gun, the combination, with the gun and breech-bolt adapted to have a rectilinear motion in their bearings, of a power-storing device, a connection between said device, the gun, and breech-bolt, adapted to impart a continuous rotary motion to the power-storing device, and a speed-controlling device operating to control the relative rectilinear speed of the gun and breech-bolt, for the purposes set forth.

9. In a breech-loading machine-gun, the combination of a stationary cooling-jacket provided with a suitable exhaust-port, a pump, and a connection between the pump and cooling-jacket with the gun adapted to have a rectilinear motion in its bearings and in said cooling-jacket and a connection between the gun and pump-piston, adapted to operate the same, for the purposes set forth.

10. In a breech-loading machine-gun, the combination, with the gun adapted to have a rectilinear motion in its bearings, a pump comprising a pump-barrel provided with suction and exhaust ports, and a rotary pump-piston and a connection between the piston and gun, adapted to convert the rectilinear motion of said gun into rotary motion of the piston, of a cooling-jacket encompassing the gun-barrel, and a connection between the said jacket and the exhaust-port of the pump-barrel, for the purposes set forth.

11. In a breech-loading machine-gun, the combination, with the gun adapted to have a rectilinear motion in its bearings, a pump comprising a cylindrical barrel or casing provided with suction and exhaust ports and a cylindrical piston adapted to revolve in said casing, a crank adapted to revolve with and about the axis of the piston, and a connection between said crank and the gun, adapted to convert its rectilinear motion into rotary motion, of a cooling-jacket encompassing the gun, and a connection between said jacket and the exhaust-port of the piston-casing, for the purposes set forth.

12. In a breech-loading machine-gun, the combination, with the gun and its receiver adapted to have a rectilinear motion in its bearings, of a pump comprising a cylindrical barrel or casing provided with suction and exhaust ports and a cylindrical piston adapted to revolve in said casing, a crank adapted to revolve with and about the axis of the piston, a lever-connection between said crank and the receiver of the gun, adapted to convert the rectilinear motion of the latter into rotary motion, a cooling-jacket encompassing the gun, and a connection between said jacket and the exhaust-port of the pump-casing, for the purposes set forth.

13. In a breech-loading machine-gun, the combination, with the gun and its receiver adapted to have a rectilinear motion in their bearings and the breech-bolt adapted to have a like motion in the receiver, of a pump comprising a cylindrical barrel or casing provided with suction and exhaust ports and a cylindrical piston adapted to revolve in said casing, a crank adapted to revolve with and about the axis of the piston, a lever connecting the receiver with the crank, a link connecting the lever with the breech-bolt, a cooling-jacket encompassing the gun, and a connection between the jacket and the exhaust-port of the pump-casing, for the purposes set forth.

14. In a breech-loading machine-gun, the combination, with the gun and its receiver adapted to have a rectilinear motion in their bearings and the breech-bolt adapted to have a like motion in the receiver, a pump comprising a cylindrical barrel or casing provided with suction and exhaust ports and a cylindrical piston adapted to revolve in said casing, a crank adapted to revolve with and about the axis of the piston, a lever connected with the crank, said lever having arms of unequal length, a connection between the shorter arm of the lever and the receiver, a connection between the longer arm of said lever and the breech-bolt, a cooling-jacket encompassing the gun, and a connection between said jacket and the exhaust-port of the pump-casing, for the purposes set forth.

15. In a breech-loading machine-gun, the combination, with the gun and its receiver adapted to have a rectilinear motion in their bearings, the breech-bolt adapted to have a like motion in the receiver, a spring-actuated firing-pin contained in the receiver, and a sear pivoted to the breech-bolt and provided with two arms and a connection between one of the arms of the sear and the firing-pin, of a revoluble power-storing device, a crank adapted to revolve with and about the axis of the device, a lever connected with the crank and receiver, and a link connected with said lever and with the breech-bolt, said lever being provided with a downwardly-projecting nose $c'$, adapted to enter between the arms of the sear, for the purposes set forth.

16. In a breech-loading machine-gun, the combination, with the gun and its receiver adapted to have a rectilinear motion in their bearings, the breech-bolt adapted to have a like motion in the receiver, a spring-actuated firing-pin contained in the breech-bolt, and a sear pivoted to the breech-bolt and adapted to move said firing-pin against the stress of its spring, of a power-storing device and a variable-speed connection between said device, the gun, and the breech-bolt, adapted to impart a continuous rotation to the power-storing device and to control the movements of the sear, for the purposes set forth.

17. In a breech-loading machine-gun, the combination, with the gun having endwise motion in its bearings, of a cooling-chamber encompassing the barrel, a rotary pump, a pipe-connection between the exhaust-port thereof and the cooling-jacket, a connection between a revoluble element of the pump and the gun, adapted to convert the rectilinear motion thereof into rotary motion, and a speed-controlling device operating to control the travel of the gun and therethrough the operation of the pump, for the purposes set forth.

18. In a breech-loading machine-gun, the combination, with the gun, its receiver, and the breech-bolt, said parts having endwise motion in their bearings, of a cooling-jacket encompassing the gun, a rotary pump, a pipe-connection between the exhaust-port of the pump and the cooling-jacket, and a variable-speed connection connecting a revoluble element of the pump with the receiver and breech-bolt, for the purposes set forth.

19. In a breech-loading machine-gun, the combination, with the gun, its receiver, and breech-bolt, said parts having endwise motion in their bearings, of a cooling-jacket encompassing the gun, a centrifugal pump, a pipe connection between the exhaust-port of the pump and the cooling-jacket, a variable-speed connection connecting a revoluble element of the pump with the receiver and breech-bolt, and a speed-controlling device adapted to control the movements of the variable-speed connection and therethrough those of the gun, the breech-bolt, and pump, for the purposes set forth.

20. In a breech-loading machine-gun, the combination, with the gun and its receiver adapted to have a longitudinal motion in their bearings, the breech-bolt adapted to have a like motion in the receiver, a spring-actuated firing-pin contained in the breech-bolt, and a sear pivotally connected with said bolt, said sear having three arms 1, 2, and 3, of which the arm 3 is in perpetual engagement with the firing-pin, of a revoluble power-storing device and a crank adapted to revolve with and about the axis of said device, a lever connecting said crank to the receiver, a link connecting the lever to the breech-bolt, said link having at its forward end a downwardly-projecting nose $c'$, and a stationary abutment in the path of the arm 2 of the sear, substantially as and for the purposes set forth.

21. In a breech-loading machine-gun, the combination of the housing B, the pump-casing $d^5$ on one side at the rear end of said housing, the cooling-jacket B' at the outer end of said housing, said cooling-jacket being provided with an inlet-port $b^7$, and a connection between said port and the exhaust-port of the pump-casing with the gun adapted to have a rectilinear motion in the housing, a combined pump-piston and fly wheel adapted to revolve in the casing, a crank connected with the piston, and a connection between said crank and the gun, adapted to convert the rectilinear motion thereof into rotary motion, for the purposes set forth.

22. In a breech-loading machine-gun, the combination, with the gun adapted to have a rectilinear motion in its bearings and a cooling-jacket encompassing the gun, of a rotary pump, a pipe-connection between the same and the cooling-jacket, and a connection between the pump-piston and the gun, adapted to convert the rectilinear motion of said gun into rotary motion, for the purposes set forth.

23. In a breech-loading machine-gun, the combination, with the gun and its receiver adapted to have rectilinear motion in their bearings and a revoluble cartridge-feeding cylinder arranged below the receiver, of a revoluble power-storing device, a connection between the same and the gun, adapted to convert the rectilinear motion of the latter into rotary motion, revoluble transmitting mechanism, and transmitting-gearing connecting the power-storing device with the cartridge-feeding cylinder, for the purposes set forth.

24. In a breech-loading machine-gun, the combination, with the gun, its receiver and breech-bolt adapted to have a rectilinear motion in their bearings, and a revoluble cartridge-feeding cylinder arranged below the receiver, of a revoluble power-storing device, a connection between said device, the receiver, and breech-bolt, adapted to convert the rectilinear motion thereof into rotary motion, and revoluble transmitting-gearing operated by the power-storing device and operating to revolve the cartridge-feeding cylinder, for the purposes set forth.

25. In a breech-loading machine-gun, the combination, with the gun, its receiver and breech-bolt adapted to have a rectilinear motion in their bearings, and a revoluble cartridge-feeding cylinder arranged below the receiver, of a revoluble power-storing device, a variable-speed connection between said device, the receiver, and breech-bolt, adapted to convert the rectilinear motion thereof into rotary motion and vary their relative speed, and revoluble transmitting-gearing operated by the power-storing device and operating to revolve the cartridge-feeding cylinder, for the purposes set forth.

26. In a breech-loading machine-gun, the combination, with the gun, its receiver and breech-bolt adapted to have a rectilinear motion in their bearings, a revoluble cartridge-feeding cylinder arranged below the receiver, a revoluble power-storing device, a crank adapted to revolve with and about the axis of the power-storing device, a variable-speed connection consisting of a two-armed lever on said crank having its shorter and longer arms connected with the receiver and breech-bolt, respectively, and a grooved disk mounted on the shaft of the power-storing device, of transmitting mechanism consisting of a transmitting-shaft and gearing connecting said shaft with the grooved disk and cartridge-feeding cylinder, respectively, for the purpose set forth.

27. In a breech-loading machine-gun, the combination, with the gun and its receiver adapted to be moved in a rectilinear direction in their bearings by the explosive force of the charge and a revoluble cartridge-feeding cylinder arranged below the receiver, of a converting mechanism for converting the rectilinear motion of the gun into rotary motion and transmitting mechanism adapted to transmit said rotary motion to the cartridge-feeding cylinder, as set forth.

28. In a breech-loading machine-gun, the combination, with the gun, the receiver, and the breech-bolt adapted to have a rectilinear motion in their bearings, said receiver being provided with a lateral opening and a fixed abutment diametrically opposite said opening and projecting into the path of the cartridge-rim, and said breech-bolt having a spring-hook on the side of the opening in the receiver to engage the rim of the cartridge and lock it to said bolt, of a revoluble power-storing device, a connection between the same and the receiver adapted to convert the rectilinear motion thereof into rotary motion, and a connection between the power-storing device and breech-bolt, for the purposes set forth.

29. In a breech-loading machine-gun, the combination, with the gun, the receiver, and the breech-bolt adapted to have a rectilinear motion in their bearings, said receiver being provided with a lateral opening and a fixed abutment diametrically opposite said opening and projecting into the path of the cartridge-rim, and said breech-bolt having a spring-hook on the side of the opening on the receiver to engage the rim of the cartridge and lock it to said bolt, of a revoluble power-storing device and variable-speed connections respectively connecting the receiver and breech-bolt with the power-storing device and adapted to vary the relative speed of the receiver and bolt and convert their rectilinear motion into rotary motion, for the purposes set forth.

30. In a breech-loading machine-gun, the combination, with the gun and its receiver adapted to have a rectilinear motion in their bearings, said receiver being provided with an opening in its under side, a revoluble drum arranged in said opening, and a pinion connected with the drum, of a revoluble power-storing device, a connection between the same and the gun, adapted to convert the rectilinear motion thereof into rotary motion transmitting-gearing comprising a disk adapted to be revolved by the power-storing device and provided with a peripheral groove, and a transmitting-shaft carrying a pinion at each end, said pinions being in engagement with the groove in the said disk and with the said drum-pinion, respectively, for the purposes set forth.

31. In a breech-loading machine-gun, the combination, with the receiver, the cartridge-feeding drum F and its pinion $h'$, and the cartridge-belt I, provided with cartridge-holders $i$, of segmental form in cross-section, of the shaft $g$, the gear-wheel $h$, in gear with the pinion $h'$, and a guide and feed wheel $g^2$, arranged in proximity to the drum F and relatively to the belt so that two of the wheel-spokes will lie in front of a cartridge-holder, substantially as and for the purpose set forth.

32. In a breech-loading machine-gun, the combination, with the receiver, the cartridge-feeding drum F and its pinion $h'$, and the cartridge-belt I, provided with cartridge-holders $i$, of segmental form in cross-section, of the shaft $g$, the gear-wheel $h$, in gear with the pinion $h'$, and a guard-wheel on said shaft $g$ arranged relatively to the belt so that one of its spokes or teeth will always be in engagement with the lower side of one of the cartridge-holders $i$, substantially as and for the purpose set forth.

33. In a breech-loading machine-gun, the combination, with the gun, the breech-bolt and its firing-pin adapted to have a reciprocating motion in their bearings, a continuously-revolving power-storing device controlled by the recoil of the gun, means for automatically locking the firing-pin into position for firing, and means for automatically releasing the said pin, said means being controlled by the reciprocating movements of the gun, of a speed-regulating device adapted to regulate the rectilinear movements of the gun, and thereby the rapidity of the firing, substantially as set forth.

34. In a breech-loading machine-gun, the combination, with the gun, the breech-bolt and its firing-pin adapted to have a reciprocating motion in their bearings, a revoluble power-storing device controlled by the recoil of the gun, an automatic cartridge-feeding mechanism, means for automatically locking the firing-pin into position for firing, and means for automatically releasing the said pin, said mechanism and means being controlled by the reciprocating movements of the gun, of a speed-regulating device adapted to regulate the speed of the movements of the gun, and thereby the rapidity of the firing and feeding of the cartridges, substantially as set forth.

In testimony whereof I affix my signature in presence of two witnesses.

EMIL RITTER VON SKODA.

Witnesses:
ALFRED SCHIFFNEY,
ADOLPH FIRCHES.